(12) United States Patent  
Fukuda

(10) Patent No.: US 7,789,569 B2  
(45) Date of Patent: Sep. 7, 2010

(54) ROLLING BEARING AND CAGE FOR ROLLING BEARING

(75) Inventor: Shinji Fukuda, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 590 days.

(21) Appl. No.: 11/812,501

(22) Filed: Jun. 19, 2007

(65) Prior Publication Data

US 2007/0292064 A1    Dec. 20, 2007

(30) Foreign Application Priority Data

Jun. 20, 2006 (JP) .......................... P2006-169917

(51) Int. Cl.
*F16C 33/66* (2006.01)

(52) U.S. Cl. ..................................... 384/470

(58) Field of Classification Search ................ 384/470, 384/523, 527, 572
See application file for complete search history.

(56) References Cited

U.S. PATENT DOCUMENTS

| 2,897,024 | A |   | 7/1959  | Chenea |            |
|-----------|---|---|---------|--------|------------|
| 3,162,493 | A | * | 12/1964 | Hanau  | ... 384/527|
| 3,383,146 | A | * | 5/1968  | Haller | ... 384/470|
| 3,529,875 | A | * | 9/1970  | McKee  | ... 384/470|
| 4,073,552 | A | * | 2/1978  | Christy| ... 384/470|
| 4,226,484 | A |   | 10/1980 | Glassow et al. |    |
| 4,243,276 | A | * | 1/1981  | Persson et al. | ... 384/470 |
| 6,485,184 | B1| * | 11/2002 | Adachi et al.  | ... 384/463 |
| 7,234,873 | B2| * | 6/2007  | Kato et al.    | ... 384/572 |

FOREIGN PATENT DOCUMENTS

| JP | 10-89365    | 4/1998  |
| JP | 11-44323    | 2/1999  |
| JP | 2001-323930 | 11/2001 |
| JP | 2002-349579 | 12/2002 |
| JP | 2004-108544 | 4/2004  |
| JP | 2005-003145 | 1/2005  |

OTHER PUBLICATIONS

Japanese Office Action dated Jun. 8, 2010 with English translation thereof.

* cited by examiner

*Primary Examiner*—Thomas R Hannon
(74) *Attorney, Agent, or Firm*—McGinn IP Law Group, PLLC

(57) ABSTRACT

A cage includes a cage body in an annular shape which is formed with a plurality of pockets for receiving rolling elements, an oil containing member in an annular shape which is attached to an inner peripheral surface of the cage body and formed of material capable of impregnating lubricating oil, and an applying member for applying the lubricating oil in the oil containing member to an inner ring.

4 Claims, 1 Drawing Sheet

ROLLING BEARING AND CAGE FOR ROLLING BEARING

BACKGROUND OF THE INVENTION

The present invention relates to a rolling bearing and a cage for the rolling bearing, and more particularly, relates to the rolling bearing and the cage for the rolling bearing in which lubricating performance has been improved.

A rolling bearing provided with a plurality of rolling elements which are disposed between two rings, namely an inner ring and an outer ring, and a cage for holding these rolling elements has been well known. It has been an object to improve lubricating performance of the rolling bearing, in case where this rolling bearing is used in a machine tool which rotates at high speed, for example. In JP-A-2005-3145, it is proposed to change a shape of the cage for the purpose of improving the lubricating performance of the rolling bearing.

In the above described conventional rolling bearing, in case where the inner ring rotates, lubricating oil which has been supplied tends to be scattered outward in a radial direction by a centrifugal force. Consequently, it is difficult to retain the lubricating oil on a raceway surface of the inner ring, as rotation speed of the inner ring becomes higher, and such inconvenience that the rolling bearing burns out due to lack of an oil film is likely to occur.

SUMMARY OF THE INVENTION

An object of the invention is to reliably supply lubricating oil to a raceway surface of an inner ring on which the lubricating oil is likely to become short due to a centrifugal force.

According to the invention, there is provided a rolling-bearing comprising a plurality of rolling elements which are interposed between two rings, namely an outer ring and an inner ring, and a cage for holding the rolling elements, characterized in that the cage includes a cage body in an annular shape formed with a plurality of pockets for receiving the rolling elements, an oil containing member in an annular shape which is attached to an inner peripheral surface of the cage body and formed of material capable of impregnating lubricating oil, and an applying member for applying the lubricating oil in the oil containing member to the inner ring.

In the conventional rolling bearing, the lubricating oil adhered to the inner ring tends to be scattered by the centrifugal force, and hence, the inner ring cannot be sufficiently lubricated. However, according to the rolling bearing in this invention, the oil containing member can absorb and retain the lubricating oil which is scattered by the centrifugal force, and it is possible to adhere the lubricating oil which has been scattered again to the inner ring by means of the applying member.

The rolling bearing can be of various types, such as a ball bearing, a roller bearing, etc.

The cage may be formed of resin, for example, but material for the cage is not limited to resin.

As material for the oil containing member, felt in which fibers are tightly entangled with each other and capable of absorbing and retaining the lubricating oil between the entangled fibers, sponge which is porous, easily deformed, and capable of absorbing and retaining the lubricating oil in its pores, and the like material may be employed.

The applying member is preferably formed of material having higher permeability than that of the oil containing member, and may include a brush made of a number of thin hairs. Material of the hair may be fiber or synthetic resin. The applying member need not be always in contact with the inner ring, but it would be sufficient that a distal end of the applying member is brought into contact with the inner ring, when the cage has come to the closest position with respect to the inner ring along with the rotation of the cage.

In the rolling bearing according to the invention, a concave groove in an annular shape to which the oil containing member is fitted may be preferably formed on the inner peripheral surface of the cage body.

The oil containing member is attached to the cage body by an adhesive, for example. On this occasion, in case where the oil containing member has been fitted into the concave groove, the oil containing member is hardly peeled off.

In the rolling bearing according to the invention, the oil containing member preferably includes an annular part in which a plurality of through holes for avoiding interference with the rolling elements are formed, and inward projecting parts which are respectively formed between adjacent through holes in the annular part, and that the inward projecting parts are formed of material having higher permeability than the annular part.

According to this structure, flows of the lubricating oil from the annular part to the inward projecting parts in the oil containing member is promoted by capillary phenomenon. Moreover, because the brush as the applying member is provided at a tip end of each of the inward projecting parts, the brush is brought into contact with the inner ring, whereby the lubricating oil in the inward projecting part can be applied to the inner ring. In this manner, the lubricating oil which has been scattered by the centrifugal force is applied to the inner ring, by circulating from the annular part of the oil containing member through the inward projecting parts of the same, the applying members (the brushes) to the inner ring. As the results, the inward projecting parts can efficiently supply the lubricating oil to the inner ring which requires the lubricating oil.

In order to make the inward projecting parts higher in permeability than the annular part, they may be formed of different materials (the annular part may be formed of felt, while the inward projecting parts may be formed of sponge, for example). Alternatively, they may be formed of the same material, but porosity may be made different between them (the annular part has larger porosity, while the inward projecting parts have smaller porosity).

A cage for a rolling bearing according to the invention is characterized by comprising a cage body in an annular shape formed with a plurality of pockets for receiving rolling elements, an oil containing member in an annular shape attached to an inner peripheral surface of the cage body and formed of material capable of impregnating lubricating oil, and an applying member for applying the lubricating oil in the oil containing member to the inner ring.

According to the cage for the rolling bearing in this invention, the inner ring, the outer ring and the rolling elements which have been conventionally used can be used as they are, by simply substituting the cage of this invention for the conventional cage.

According to the rolling bearing and the cage for the rolling bearing in this invention, the lubricating oil which has been scattered by the centrifugal force is absorbed and retained by the oil containing member. Moreover, because the applying member directly applies the lubricating oil to the inner ring, the inner ring which needs to be lubricated can be reliably lubricated.

DETAILED DESCRIPTION OF PREFERRED EMBODIMENTS

Now, an embodiment of the invention will be described with reference to the drawings.

Figure 1:
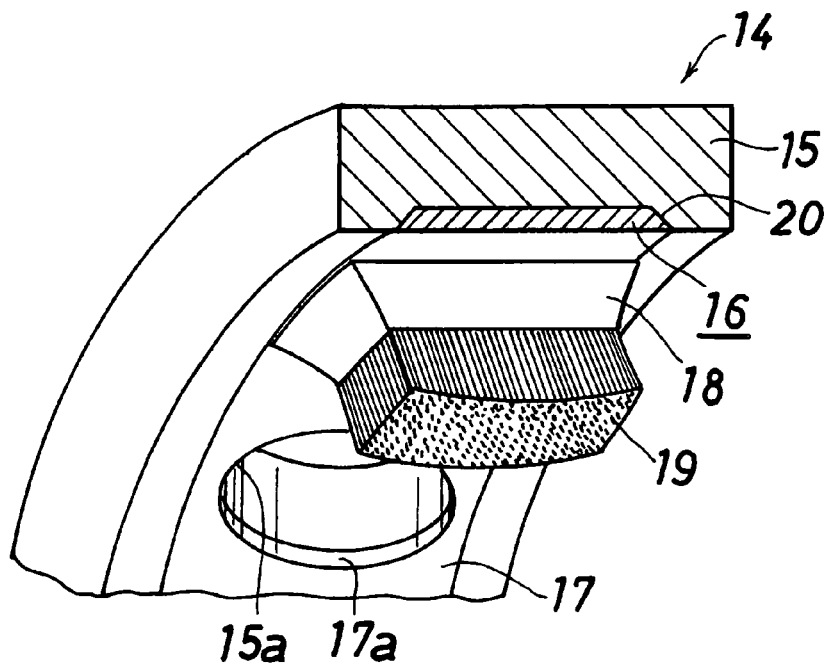
FIG. 1 is a perspective view showing an embodiment of a rolling bearing according to the invention.
Figure 2:
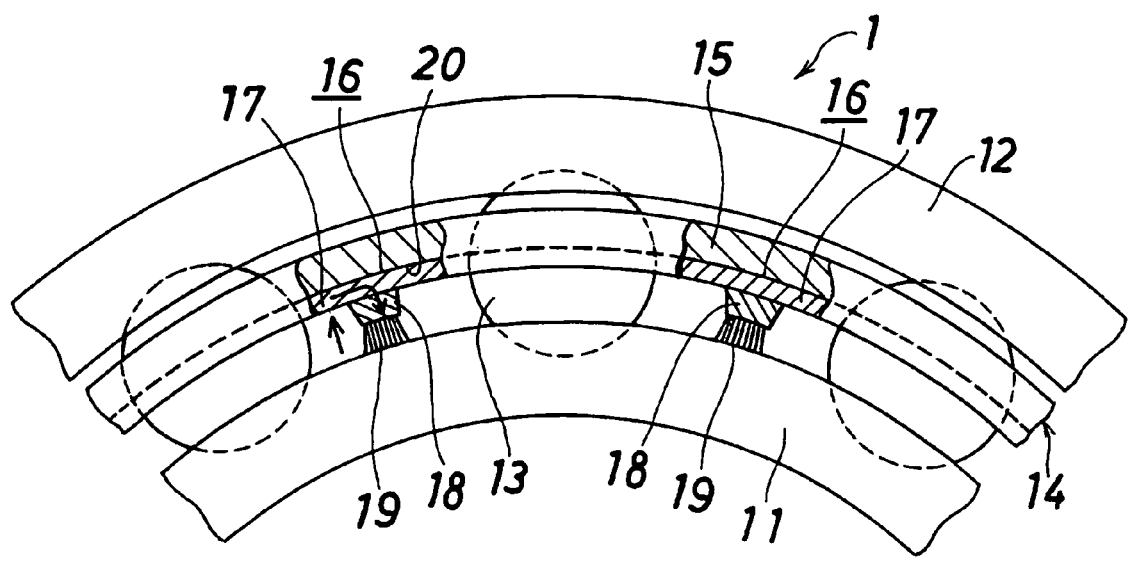
FIG. 2 is a side view partly cut away showing the embodiment of the rolling bearing according to the invention.

An embodiment of the invention is shown in FIGS. 1 and 2. It is to be noted that "upside and downside" in the following description corresponds to upside and downside in the drawings.

FIG. 1 shows a part of a cage 14 for a rolling bearing according to the invention, and FIG. 2 shows a part of a rolling bearing 1 according to the invention.

The rolling bearing 1 is a ball bearing in which an inner ring 11 rotates. The rolling bearing 1 includes an outer ring 12, a plurality of balls (rolling elements) 13 which are interposed between the inner ring 11 and the outer ring 12 at equal intervals in a circumferential direction, and a cage 14 for holding a plurality of the balls 13 at the equal intervals in the circumferential direction.

The cage 14 includes a cage body 15 in an annular shape formed with a plurality of pockets 15a for receiving the balls 13, an oil containing member 16 in an annular shape attached to an inner peripheral surface of the cage body 15, and applying members 19 which are integrally formed with the oil containing member 16 and adapted to apply lubricating oil to the inner ring 11. The cage 14 is so constructed that its outer peripheral surface is guided along an inner peripheral surface of the outer ring 12.

The cage body 15 is formed of synthetic resin, and a concave groove 20 in an annular shape to which the oil containing member 16 is fitted is formed on the inner peripheral surface of the cage body 15.

The oil containing member 16 includes an annular part 17 through which a plurality of through holes 17a for receiving the balls 13 are formed, and inward projecting parts 18 in a substantially parallelepiped shape which are formed at every position between the through hole 17a and the adjacent through hole 17a. The annular part 17 is formed of felt in which fibers are tightly entangled with each other and capable of impregnating the lubricating oil. The inward projecting parts 18 are formed of sponge which is porous having a number of pores and has higher permeability of the lubricating oil than the annular part 17.

The annular part 17 of the oil containing member 16 has the same as or a slightly larger width than the concave groove 20 of the cage body 15 and attached to the cage body 15 by an adhesive, so that the through holes 17a may be aligned with the pockets 15a.

Each of the applying members 19 is a brush 19 which is formed of a number of thin hairs. The brush 19 is so positioned as to be brought into contact with the inner ring 11 along with the rotation of the cage 14.

According to this rolling bearing 1, the lubricating oil which has been adhered to the inner ring 11 would be scattered by the centrifugal force, and adhered to the oil containing member 16 to be retained there. The lubricating oil inside the oil containing member 16 tends to move outward in a radial direction under an action of the centrifugal force, that is, the lubricating oil in the inward projecting parts 18 tends to move toward the annular part 17. However, because the inward projecting parts 18 are formed of the material having higher permeability than the annular part 17, the lubricating oil moves from the annular part 17 toward the inward projecting parts 18.

The brushes 19 absorb the lubricating oil in the inward projecting parts 18 by a capillary force. When the cage 14 is rotated and comes near the inner ring 11, tip ends of the brushes 19 are brought into contact with the inner ring 11 while it rotates, and the lubricating oil is applied to the inner ring 11. In this manner, supply of the lubricating oil is performed. In case where the lubricating oil is scattered again by the centrifugal force after it has been supplied to the inner ring 11, the lubricating oil is adhered to the oil containing member 16, and circulate in order, from the annular part 17 of the oil containing member 16 to the inward projecting parts 18, from the inward projecting parts 18 to the brushes 19, and from the brushes 19 to the inner ring 11, as shown by an arrow mark in FIG. 2. As the results, it is possible to lubricate the rolling bearing 1 even with a small amount of the lubricating oil.

In the above described embodiment, the annular part 17 of the oil containing member 16 is formed of felt, and the inward projecting parts 18 of the oil containing member 16 are formed of sponge. However, the invention is not limited to such combination of the materials, but various other combinations can be made, as long as the inward projecting parts 18 are formed of material having higher permeability than the annular part 17. Moreover, the above described embodiment is described in a state where the brushes 19 are provided. However, in case where the inward projecting parts 18 are formed of material which gradually exudes the lubricating oil, it is possible to obtain similar effect by bringing their tip ends into contact with the inner ring 11. In this case, there is no necessity of attaching the brushes 19 which correspond to the applying member, to the tip ends.

What is claimed is:

1. A rolling bearing comprising:
    an inner ring;
    an outer ring;
    a plurality of rolling elements interposed between the inner ring and outer ring; and
    a cage that holds the plurality of rolling elements,
    wherein the cage includes:
        a cage body in an annular shape formed with a plurality of pockets for receiving the plurality of rolling elements;
        an oil containing member in an annular shape which is attached to an inner peripheral surface of the cage body and formed of material capable of being impregnated by lubricating oil; and
        an applying member, for applying the lubricating oil in the oil containing member to the inner ring,
    wherein the oil containing member includes an annular part in which a plurality of through holes for avoiding interference with the rolling elements are formed, and an inward projecting part formed between adjacent through holes of the plurality of through holes in the annular part, and
    wherein the inward projecting part includes a material comprising a permeability greater than a permeability of said annular part.

2. The rolling bearing according to claim 1, wherein a concave groove in an annular shape for fitting the oil containing member is formed on the inner peripheral surface of the cage body.

3. A cage for a rolling bearing, the cage comprising:
   a cage body in an annular shape formed with a plurality of pockets for receiving a plurality of rolling elements;
   an oil containing member in an annular shape attached to an inner peripheral surface of the cage body and formed of material capable of being impregnated by lubricating oil; and
   an applying member, for applying the lubricating oil in the oil containing member to an inner ring of the rolling bearing;
   wherein the oil containing member includes an annular part in which a plurality of through holes for avoiding interference with the plurality of rolling elements are formed, and an inward projecting part formed between adjacent through holes of the plurality of through holes in the annular part, and
   wherein the inward projecting part includes a material comprising a permeability greater than a permeability of said annular part.

4. The cage according to claim 3, wherein a concave groove in an annular shape for fitting the oil containing member is formed on the inner peripheral surface of the cage body.

\* \* \* \* \*